United States Patent Office 3,354,011
Patented Nov. 21, 1967

3,354,011
PROPELLANT COMPRISING A PERFLUORO-
GUANIDINE CONTAINING OXIDANT AND
A FUEL
James L. Kroon and Ralph A. Davis, Midland, Mich., assignors to The Dow Chemical Company, Midland, Mich., a corporation of Delaware
No Drawing. Original application July 14, 1961, Ser. No. 126,441. Divided and this application Mar. 29, 1963, Ser. No. 270,490
1 Claim. (Cl. 149—22)

This application is a division of our copending application Ser. No. 126,441, filed July 14, 1961. This invention pertains to a substituted guanidine, more particularly perfluoroguanidine and its use in a propellant composition.

The novel perfluoroguanidine is a clear colorless liquid having a boiling point of $-1.1°$ C. and a formula:

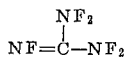

The novel compound finds utility as an intermediate and as an oxidant for fuels in propellants. For the most efficient use of perfluoroguanidine as an oxidant, perfluoroguanidine is generally intermixed with an oxygen containing oxidant in an amount sufficient to oxidize the carbon in the perfluoroguanidine and the fuel. Examples of some of the commonly used oxygen containing oxidants which may be intermixed with the perfluoroguanidine for this purpose are perchlorates, nitrates, $N_2O_4$ and other nitro compounds such as tetranitromethane. When perfluoroguanidine is used as an oxidant with $N_2O_4$ for a fuel, such as pentaborane, a theoretical specific impulse of 325 is obtained. It may be used very conveniently with liquid propellant fuels, such as hydrazine and substituted hydrazines. When it is used with hydrazine and a mixture of $N_2O_4$ a theoretical specific impulse of 307 is obtained. It may also be used with solid fuels, such as lithium, aluminum, beryllium, and the hydrides of these metals.

The new compound may be prepared by the fluorination of guanidine in the presence of an alkali metal fluoride, alkaline earth metal fluoride, or an oxide of alkaline earth metals, aluminum, vanadium, titanium, and zirconium as described in patent application Ser. No. 63,215 dated Oct. 17, 1960, now U.S. Patent No. 3,228,936, of Ralph A. Davis, coinventor in the instant application, and one Kenneth O. Groves.

In carrying out the reaction, guanidine as a hydrofluoric acid salt or a salt of a mineral acid is intermixed with the particular metal fluoride or oxide and the mixture contacted with fluorine gas generally diluted with an inert diluent. Various known methods and equipment for carrying out the gas-solid reactions may be used. A fixed or fluidized bed reactor is often the most convenient method.

Although the weight ratio of the metal fluoride or oxide to guanidine used may be as little as 0.5:1, it may be as high as 10:1. It is generally preferred to use an amount of the metal fluoride or oxide which is from 2 to 5 times that of the guanidine.

Any inert gaseous diluent may be intermixed with fluorine used in the fluorination. Nitrogen is most conveniently used due to its availability. The fluorine concentration in the gaseous mixture is generally in the range of 1 to 30 volume percent. With a concentration below 1 volume percent of fluorine, the reaction rate is too slow for practical use but operative. A gas mixture containing over 50 volume percent of fluorine is seldom employed.

While temperatures below $-20°$ C. may be used for carrying out the reaction, the reaction is preferably carried out at about $0°$ C. The perfluoroguanidine formed is thus vaporized and recovered in a condenser maintained at a temperature below the boiling point of the perfluoroguanidine. The product thus obtained by condensation may be further purified if desired by further distillation.

To illustrate the preparation of perfluoroguanidine, 24 grams of magnesium fluoride and 24 grams of sodium fluoride were placed in a three necked Monel flask equipped with a stirrer. Five grams of guanidine hydrofluoride were added to the Monel flask and the flask was flushed with nitrogen gas. The flow of nitrogen gas was adjusted to 300 milliliters per minute. The flask was then immersed in wet ice and fluorine introduced into the flask at a rate of 100 milliliters per minute while the contents were being stirred. Fluorination was allowed to proceed for approximately two hours with constant stirring. The vapors from the Monel flask were passed through a trap maintained at $-80°$ C. with solid carbon dioxide.

The perfluoroguanidine thus obtained and further purified by distillation had a boiling point of $-1.1°$ C. and was a colorless liquid. Three molecular weight measurements were made using the vapor-density method. It was found that the molecular weight was 149.0, 148.4 and 148.1. The formula weight of perfluoroguanidine is 149.0.

The Antoine equation constants were found to be, $A=6.2385$; $B=689.385$; and $C=206.44$. The heat of vaporization at $-1.1°$ C. was 5.5 kilocalories per mole.

Infrared spectrum showed a large NF absorption in the 10–11 micron region, the absence of a CF absorption in the 7–8 micron region, and a weak but definite absorption peak of the C=N bond at 6.1–6.2 microns. Mass spectrometry data indicated mass peaks at 149, 97, 78 and 59, confirming molecular weight measurements. The magnetic resonance data indicated the presence of two $NF_2$ groups and one C=NF group.

What is claimed is:
In a propellant containing an oxidant and a fuel, said oxidant consisting essentially of a mixture of perfluoroguanidine and an oxygen containing oxidant selected from the group consisting essentially of perchlorates, nitrates, nitrogen tetroxide and tetranitromethane and said fuel being a member selected from the group consisting essentially of tetraborane, hydrazine, lithium, aluminum, beryllium and hydrides of these metals, the amount of said oxidant being sufficient to oxidize the carbon in said perfluoroguanidine and said fuel member.

No references cited.

CARL D. QUARFORTH, Primary Examiner.

L. A. SEBASTIAN, Assistant Examiner.